United States Patent
Quinn et al.

(10) Patent No.: US 6,621,964 B2
(45) Date of Patent: Sep. 16, 2003

(54) NON-STRANDED HIGH STRENGTH FIBER OPTIC CABLE

(75) Inventors: Chris M. Quinn, Hickory, NC (US); Douglas S. Hedrick, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 19 days.

(21) Appl. No.: 09/861,831

(22) Filed: May 21, 2001

(65) Prior Publication Data

US 2002/0172477 A1 Nov. 21, 2002

(51) Int. Cl.[7] .................................................. G02B 6/44
(52) U.S. Cl. ........................................................ 385/105
(58) Field of Search ............................... 385/105, 103, 385/104, 106, 110

(56) References Cited

U.S. PATENT DOCUMENTS

| | | | |
|---|---|---|---|
| 3,865,466 A | 2/1975 | Slaughter | 350/96 B |
| 4,093,342 A | 6/1978 | Foord et al. | 350/96.23 |
| 4,166,670 A * | 9/1979 | Ramsay | 385/113 |
| 4,354,732 A | 10/1982 | Arnaud et al. | 350/96.23 |
| 4,360,395 A | 11/1982 | Suzuki | 156/54 |
| 4,422,889 A | 12/1983 | Trezeguet et al. | 156/70 |
| 4,491,387 A | 1/1985 | Dey et al. | 350/96.23 |
| 4,504,112 A | 3/1985 | Gould et al. | 350/96.23 |
| 4,557,559 A | 12/1985 | Winter | 350/96.23 |
| 4,577,925 A | 3/1986 | Winter et al. | 350/96.23 |
| 4,671,610 A | 6/1987 | Kitayama et al. | 350/96.23 |
| 4,685,765 A | 8/1987 | Daly et al. | 350/96.21 |
| 4,699,461 A | 10/1987 | Taylor et al. | 350/96.23 |
| 4,775,213 A | 10/1988 | Kitayama | 350/96.23 |
| 4,786,138 A | 11/1988 | Buckley | 350/96.23 |
| 4,793,686 A | 12/1988 | Saito | 350/96.23 |
| 4,822,133 A | 4/1989 | Peacock | 350/96.23 |
| 4,830,459 A | 5/1989 | Chicken et al. | 350/96.23 |
| 4,852,965 A * | 8/1989 | Mullin et al. | 385/112 |
| 4,878,733 A | 11/1989 | Winter et al. | 350/96.23 |
| 4,984,869 A | 1/1991 | Roche | 350/96.23 |
| 5,050,960 A | 9/1991 | Sutehall | 385/113 |
| 5,067,830 A | 11/1991 | McAlpine et al. | 385/114 |
| 5,082,380 A | 1/1992 | Sutehall et al. | 385/114 |
| 5,115,485 A | 5/1992 | Gandy | 385/101 |
| 5,166,998 A * | 11/1992 | Patel | 385/114 |
| 5,495,546 A | 2/1996 | Bottoms, Jr. et al. | 385/100 |
| 5,982,966 A | 11/1999 | Clouston | 385/100 |
| 5,991,485 A | 11/1999 | Kertscher et al. | 385/100 |
| 6,169,834 B1 * | 1/2001 | Keller | 385/101 |
| 6,249,629 B1 * | 6/2001 | Bringuier | 385/101 |

FOREIGN PATENT DOCUMENTS

| | | | |
|---|---|---|---|
| EP | 1093594 | 10/1999 | G02B/6/44 |
| GB | 1250823 | 10/1971 | |

OTHER PUBLICATIONS

Optical Transmission Element, Publication No. WO99/53353, Publication Date: Oct. 21, 1999.

* cited by examiner

*Primary Examiner*—Lynn Feild
*Assistant Examiner*—Brian S. Webb
(74) *Attorney, Agent, or Firm*—Michael E. Carroll, Jr.

(57) ABSTRACT

A fiber optic cable having at least one interface being formed by a plurality of adjacent support members. Adjacent the interface is at least one retention area having an optical fiber component disposed therein. The retention area is disposed generally longitudinally and non-helically relative to an axis of the cable. The cable can also include a cable jacket substantially surrounding the support members, a cushioning zone adjacent the optical fiber component, a water-blocking component and/or an interfacial layer at least partially disposed between an outer surface of the support members and the cable jacket.

54 Claims, 3 Drawing Sheets

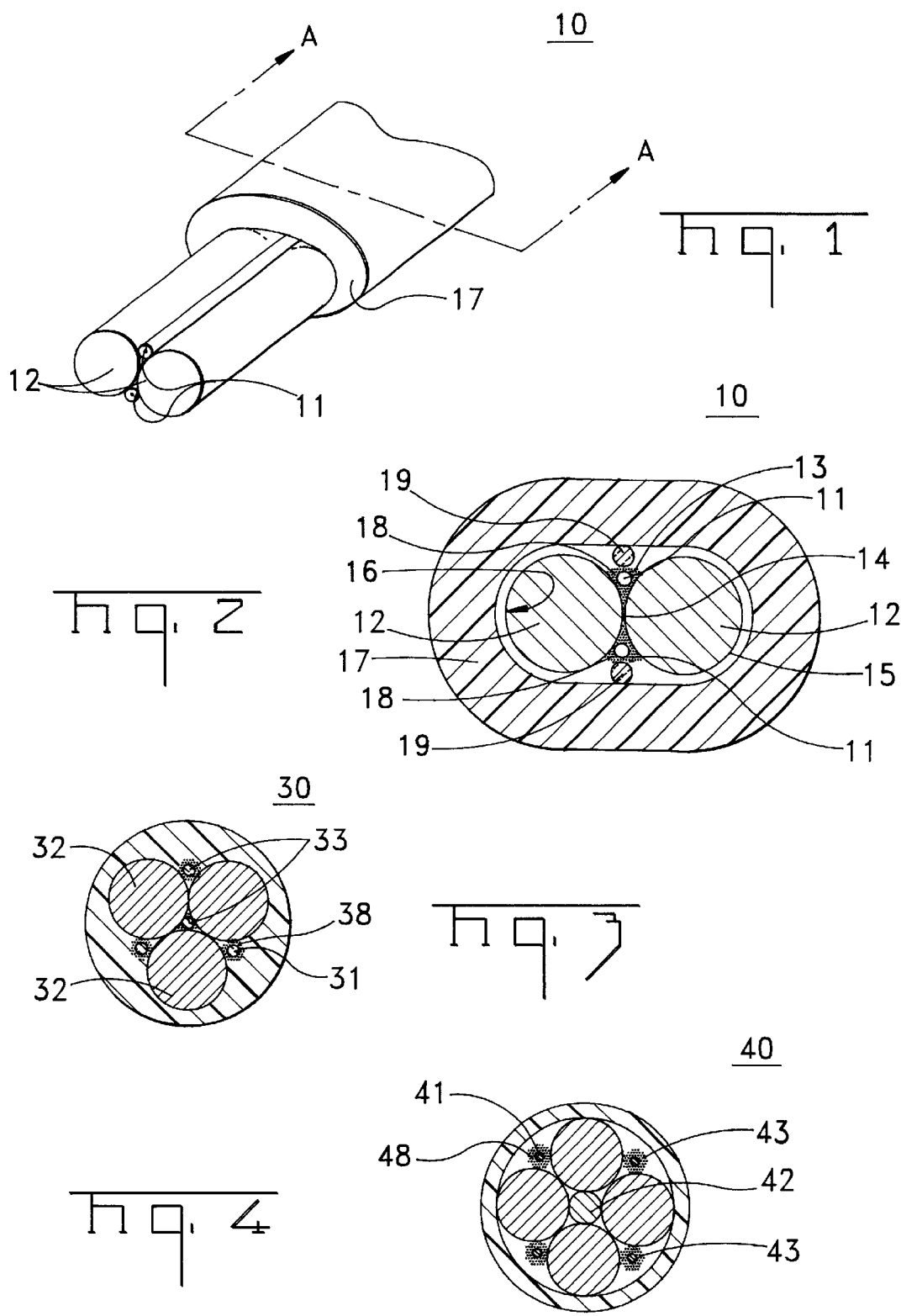

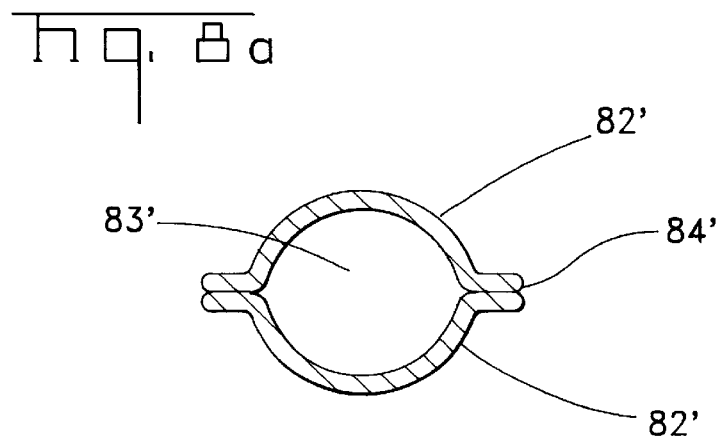
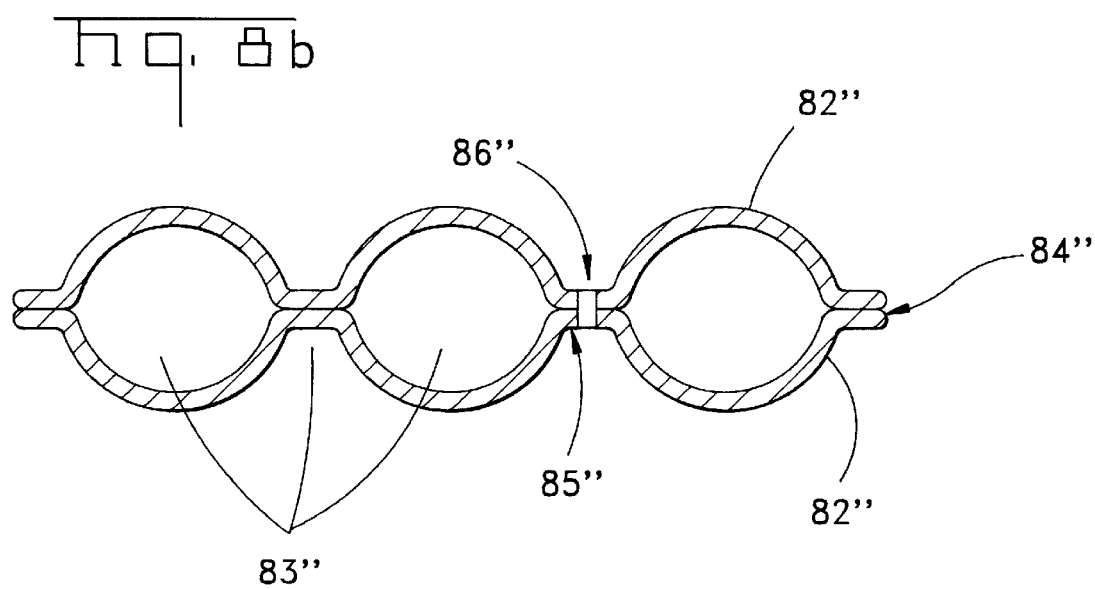

NON-STRANDED HIGH STRENGTH FIBER OPTIC CABLE

FIELD OF THE INVENTION

The present invention relates generally to fiber optic cables.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand will require low fiber count optical cables to be routed to end users, for example, businesses and households.

Fiber optic cables can typically be used in various applications. For example, fiber optic cables may be suitable for both aerial and buried cable applications. More specifically, a fiber optic cable may be strung between poles and/or buried in the ground before reaching the end user. Aerial and buried cable environments have unique requirements and considerations. Optical fiber cables should meet the unique requirements and considerations of intended environments, yet still remain cost effective.

In addition to being cost effective, cables should be simple to manufacture. An example of a low fiber count optical cable manufactured in one step and having optical fibers disposed longitudinally to the cable axis is disclosed in U.S. Pat. No. 5,115,485. An optical fiber is disposed within an electrically conductive strength member that is surrounded and embedded in an elastomeric material that forms the outer jacket. The cable also includes optical fibers embedded in the elastomeric material. This known fiber optic cable has several disadvantages. For example, because the electrically conductive strength member surrounds the optical fiber, it is difficult to access the fiber. Moreover, accessing the central optical fiber may result in damage to the embedded optical fibers. Additionally, the embedded optical fibers are coupled to the elastomeric material that forms the outer jacket. Consequently, when the elastomeric outer jacket is stressed, for example, during bending, tensile and compressive stresses can be transferred to the optical fibers, thereby degrading optical performance.

Moreover, fiber optic cables that are strung between poles can carry a tensile load. An example of a fiber optic cable designed to carry a tensile load is disclosed in U.S. Pat. No. 4,166,670, which is incorporated herein by reference. This known optical fiber cable requires a plurality of stranded strength members having circular cross-sections. The stranded strength members define tricuspid interstices therebetween in which an optical fiber is disposed. During manufacture, the interstices can be filled with petroleum jelly while the circular strength members and optical fiber are stranded together. Although this known fiber optic cable is designed to prevent the application of tensile stress to the optical fibers, this design has several disadvantages. For example, costs are higher because the helical orientation of the optical fibers necessitates the use of a longer length of optical fiber than the length of the cable in which it resides. Moreover, from a manufacturing standpoint, it can be more difficult and expensive to strand the strength members and optical fibers.

ASPECTS OF THE INVENTION

One aspect of the present invention provides a fiber optic cable having at least one interface being formed by a plurality of adjacent support members. Adjacent the interface is at least one retention area having an optical fiber component disposed therein. The retention area is disposed generally longitudinally and non-helically relative to an axis of the cable. The cable also includes a cable jacket substantially surrounding the support members. The cable can include a cushioning zone adjacent the optical fiber component, a water-blocking component and/or an interfacial layer at least partially disposed between an outer surface of the support members and the cable jacket.

Another aspect of the present invention provides a fiber optic cable having at least one interface being formed by a plurality of adjacent support members. Adjacent the interface is at least one retention area having an optical fiber component disposed therein. The retention area is disposed generally longitudinally and non-helically relative to an axis of the cable. The cable also includes a cushioning zone and both an interfacial layer and a water-blocking component at least partially disposed between an outer surface of the support members and a cable jacket generally surrounding the support members.

A further aspect of the present invention provides a fiber optic cable having at least one interface being formed by a plurality of adjacent support members. Adjacent the interface is at least one retention area having an optical fiber component disposed therein. The retention area is disposed generally longitudinally and non-helically relative to an axis of the cable, the cable preferably having a strain of about 1.0% or less when a 1,000 lb. tensile force is applied. The cable can include a cable jacket, a cushioning zone, a water-blocking component and/or an interfacial layer.

BRIEF DESCRIPTION OF THE FIGURES

FIG. 1 is an isometric view of a fiber optic cable in accordance with an embodiment of the present invention.

FIG. 2 is a cross sectional view of the embodiment of FIG. 1 taken along line A—A.

FIG. 3 is a cross-sectional view of a fiber optic cable in accordance with another embodiment of the present invention.

FIG. 4 is a cross-sectional view of a fiber optic cable in accordance with another embodiment of the present invention.

FIGS. 8a and 8b are cross-sectional views of support members in accordance with other embodiments of the present invention.

DETAILED DESCRIPTION OF THE INVENTIONS

Figure 5:
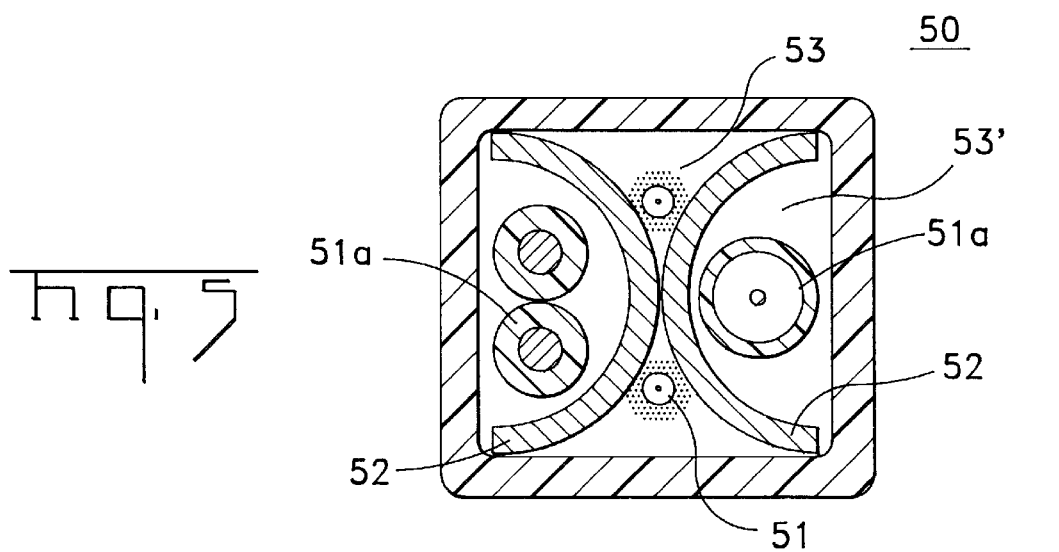
FIG. 5 is a cross-sectional view of a fiber optic cable in accordance with another embodiment of the present invention.

A fiber optic cable 10 according to an embodiment of the present invention is depicted in FIGS. 1 and 2. Fiber optic cable 10 includes at least one interface 14 being formed by a plurality of adjacent support members 12, adjacent interface 14 is at least one retention area 13 that can include an optical fiber component 11 disposed therein. A cable jacket 17 substantially surrounds optical fiber component 11 and support members 12. A cushioning zone 18 can be disposed adjacent to the optical fiber component, and a water-blocking component 19 can be enclosed by the cable jacket 17.

Optical fiber component 11 preferably comprises a single, loose optical fiber. However, component 11 may be loose or tight buffered optical fibers, bundled or ribbonized optical fibers in a common matrix, a stack of optical fiber ribbons in a common matrix or any combination thereof. Each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Each optical fiber can be, for example, a single-mode or multi-mode optical fiber available commercially from Corning Inc.

One embodiment can include cushioning zone 18, which preferably preserves optical performance within desirable ranges. Cushioning zone 18 is preferably operable to decouple optical fiber component 11 from generally round support members 12 and/or jacket 17. Cushioning zone 18 can be generally interposed between support members 12 and optical fiber component 11, for the purpose of decoupling optical fiber component 11 from support members 12 and/or jacket 17. Decoupling permits relative movement between the optical fiber component 11 and support members 12 during, for example, thermal variations or cable bending. Moreover, cushioning zone 18 can substantially surround optical fiber component 11. If employed, cushioning zone 18 can include grease, but may include other materials such as aramid fibers, gels, foams, thermoplastic filling compounds, water-blocking compounds such as tapes, yarns and/or powders.

Embodiments can also include an interfacial layer 15 at least partially disposed on and/or between an outer surface 16 of support members 12 and cable jacket 17. If employed, interfacial layer 15 can include a coating having corrosion protection, for example, copper cladding, but can include: a water-swellable material; a material to promote adhesion between the support members 12 and cable jacket 17, such as, ethylene acrylic acetate; a primer, plastic, tape, zinc, copper, other corrosion protective materials; and/or a predetermined surface roughness for adhesion purposes.

Water-blocking component 19 can be disposed in at least one retention area 13 formed by support members 12 or disposed between support members 12 and cable jacket 17. For example, water-blocking component 19 can include a yarn helically wrapped around support members 12 also functioning to hold optical fiber component 11 in place. Water-blocking component 19 generally includes water-swellable particles that swell upon exposure to water so as to form a blockage in the cable for inhibiting the further migration of water in the cable. Generally, the water-swellable particles are formed of a superabsorbent polymer on or in a medium, for example, a yarn or tape. Preferred superabsorbent polymers are partially cross-linked polymers that absorb many times their own weight in water and swell considerably without dissolving, for example, acrylate, urethane or cellulosic based materials. Water-blocking component 19 may also serve other functions, for example, the water-blocking component may also function as a ripcord for convenient fiber access. Component 19 can also function as indicia of fiber location by slightly protruding from the profile of the cable jacket.

Cable jacket 17 generally provides environmental protection and generally surrounds optical fiber component 11 and support members 12. Cable jacket 17 can also be in communication with retention area 13. Cable jacket 17 is preferably formed of polyethylene or flame-retardant plastics, such as PVC or flame retardant polyethylene. A tube-on or pressure extrusion process may be used to apply cable jacket 17, which generally has a thickness of about one-millimeter. The shape of cable jacket 17 generally conforms to the shape of support members 12.

Support members 12 can include a high strength material, e.g., steel, but they may be manufactured from any suitable dielectric or metallic material. Such materials include, for example, aluminum, carbon fiber, copper, composite metals, plastics, or glass-reinforced plastics. Embodiments of cables according to the present invention can be mechanically robust, for example, support members 12 are formed of a high strength material that can withstand a predetermined tensile load, up to about 1000 lbs. or more. Additionally, cable 10 can include a minimum bend radius of about 10 centimeters or less and a maximum span of about two-hundred feet or more. Moreover, at the predetermined tensile load support members 12 and/or cable 10 should have a strain in the range of essentially about 0% to about 1.0%, more preferably between essentially about 0% and about 0.3% and most preferably between essentially about 0% and about 0.1%. Additionally, cable 10 can have an excess fiber length to generally accommodate the range of strains. Excess fiber length in cable 10 can be accomplished, for example, by placing optical fiber component 11 adjacent stressed support members during the manufacturing process.

Retention area 13 comprises optical component receiving areas, but can include a coaxial cable, a twisted pair or power wires. Retention area 13 can be a concave valley formed adjacent interface 14, but can be formed by a single support member (FIG. 5). In general, retention area 13 is generally longitudinally disposed substantially parallel to the cable axis. Preferably, retention areas according to the present invention are non-helical and generally longitudinally disposed to an axis of the cable. Retention area 13 preferably does not include sharp corners and/or edges, but may include a coating on support member 12, for example, a thermoplastic layer, forming a smooth surface. Moreover, one embodiment can include retention area 13 having an air gap between optical fiber component 11 and a coating on support member 12.

The shape and size of support member 12 can control the size and shape of retention area 13. Each support member 12 can have a respective center of curvature that is generally offset from a center of curvature of another support member 12, however the centers of curvature can be generally concentric (FIG. 8a). As illustrated in FIG. 2, generally convex retention area 13 of the preferred embodiment is sized to receive a 250 micron optical fiber component. By way of example, support members 12 are round steel wires with diameters of at least about 1.30 millimeters, which allows space for movement of optical fiber component 11.

Additionally, support members 12 are preferably selected based on such considerations as crush ratings, temperature range, strain and/or stress loads. In one embodiment, optical fiber component 11 will be located at about or as close as possible to a neutral bending axis of the cable for avoiding undue stress on the optical fiber component. In other words, optical fiber component 11 is located generally on a transverse plane, generally perpendicular to the cross-section, that generally experiences about zero stress, or as close as possible to zero stress, when the fiber optic cable is installed.

In other aspects of the present inventive concepts, the size, shape and/or pattern of support members 12 can advantageously control the location of the neutral axis of the cable. Moreover, by taking into account the size, shape and/or pattern of support members 12 the bending preference of cable 10 can be manipulated. The cable can generally have no bending preference if the bending moments of inertia along X and Y coordinate orthogonal axes are about roughly equal, for example, a central support member with six identical support members symmetrically arranged around the central support member. The cable can have a preferential bend characteristic if one of the bending moments of inertia is about two to five times greater than the other orthogonal axis. Additionally, the cable can also have a high preferential bend characteristic if one of the bending moments of inertia is about five times or more than the orthogonal axis.

Support members 12 can be generally apart or in contact at the interfaces therebetween. Support members 12 can be fixed, or removably fixed, to each other to prevent movement between, or among, support members 12 during, for example, bending. Suitable fixing means include adhesives, cold-welding, crimping, interlocking means, welding and/or roll-forming.

Additionally, cable jacket 17 can include a retention area marking indicia (not illustrated) to aid in locating the optical fiber component 11. One embodiment can include a cable jacket 17 marking indicia formed by a stripe, but may be a protrusion on the cable jacket 17, an indentation, a hot foil stripe, dot, ink jet or laser printing or any other suitable indicia indicating the location of retention area 13. Moreover, the shape of the jacket or support members may indicate the location of retention area 13. The indicia can also be an indentation as disclosed in U.S. Pat. No. 5,067,830, which is incorporated herein by reference.

Fiber optic cable 10 can have a range of outer diameters or major transverse measurements, but the outer diameter or major transverse measurement can be about 1 millimeter to about 15 millimeters or more. Additionally, fiber optic cable 10 may have different shapes, for example, circular, rectangular, square or elliptical.

Fiber optic cable 10 is advantageous because, for example, it can be suitable for both aerial and buried cable environments, it is reliable and can be manufactured at low cost. A further advantage of cable 10 is that a craftsman knows where optical fiber components 11 are located and can easily access the same by running a cutting knife flat against support members 12 without damaging components 11. However, fiber optic cable 10 can take other forms while still providing these same advantages. As shown in FIG. 3, for example, fiber optic cable 30 is another embodiment of the present invention. As described in conjunction with the embodiments of FIG. 1, fiber optic cable 30 includes a plurality of retention areas 33 formed by a plurality of support members 32. Retention areas 33 of support members 32 can define various shapes and depths, for example, a generally triangular retention area is formed by support members 32 in the center of cable 30. Optical fiber components 31 can be disposed within each retention area 33, as illustrated, this embodiment includes an optical fiber and a cushioning zone 38 in each of the four retention areas 33. The embodiment in FIG. 3 can include an interfacial layer on an outer surface of support members 32, a cushioning zone, and/or a water-blocking component as described herein.

FIG. 4 illustrates fiber optic cable 40, another embodiment of the present invention. As described in conjunction with the embodiments of FIG. 1, fiber optic cable 40 includes a plurality of retention areas 43 formed by a plurality of different sized support members 42. In this embodiment the center support member has a smaller diameter than the outer support members, but the center support member can be larger. The center member can also be a buffer tube or a coaxial cable. Retention areas 43 of support members 42 can define various shapes and depths. Optical fiber components 41 can be disposed within each retention area 43, for example as illustrated, this embodiment includes an optical fiber and a cushioning zone 48 in retention areas 43. The embodiment of FIG. 4 can include an interfacial layer on an outer surface of support members 32, a cushioning zone, and/or a water-blocking component as described herein.

FIG. 5 illustrates fiber optic cable 50, which depicts other aspects of the present invention. As described in conjunction with the embodiments of FIG. 1, fiber optic cable 50 includes a plurality of retention areas 53 formed by a plurality of support members 52. Support members 52 are formed into generally arcuate shapes with retention areas 53 defining different shapes and depths. More particularly, support members 52 are generally semi-circular half-shells forming a generally convex retention area 53. In this embodiment larger retention areas 53' can include electrical components 51a, for example, a twisted pair, a coaxial cable or power wires, while the smaller retention areas can include optical fiber components 51. The embodiment in FIG. 5 can include an interfacial layer on an outer surface of support members 32, a cushioning zone, and/or a water-blocking component as described herein. Moreover, cable 50 can have other cross-sectional shapes, such as rectangular, by forming support members 52 with different radii of curvatures and arc lengths.

Figure 6:
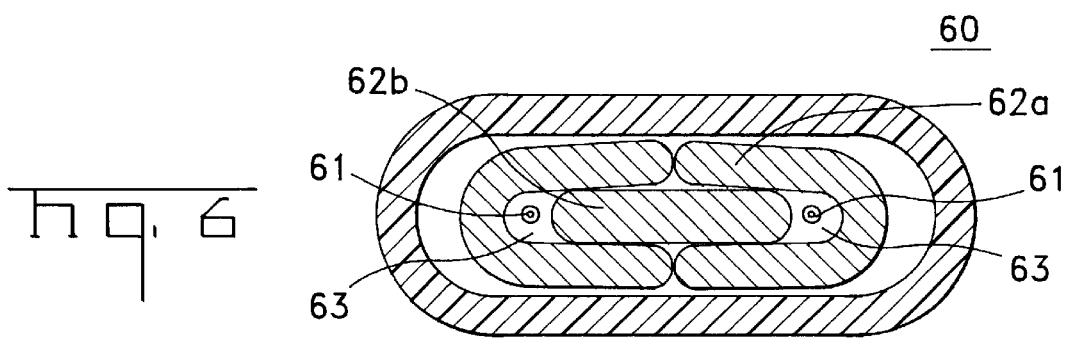
FIG. 6 is a cross-sectional view of a fiber optic cable in accordance with another embodiment of the present invention.

FIG. 6 illustrates fiber optic cable 60, another embodiment of the present invention. As described in conjunction with the embodiments of FIG. 1, fiber optic cable 60 includes a plurality of retention areas 63 formed by a plurality of support members 62. A pair of outer support members 62a are formed into generally arcuate shapes while an inner support member 62b has a generally flat shape. Each outer support member 62a fits over a side of the inner support member 62b a predetermined distance such that retention area 63 is created. More particularly, a generally concave surface of support member 62a and a generally convex surface of support member 62b cooperate forming retention area 63. Preferably, the interface between the inner and outer support members is selected so that an optical fiber component 61 has room for movement and avoids crushing. Specifically, support member 62a can include a taper so that support member 62b can only enter a predetermined distance and/or support members 62a can abut each other preventing further engagement. The embodiment in FIG. 6 can include an interfacial layer on an outer surface of support members 62a and 62b, a cushioning zone, and/or a water-blocking component as described herein. Moreover, support members 62a and 62b can include different materials, for example, steel and plastic.

Figures 7A, 7B:
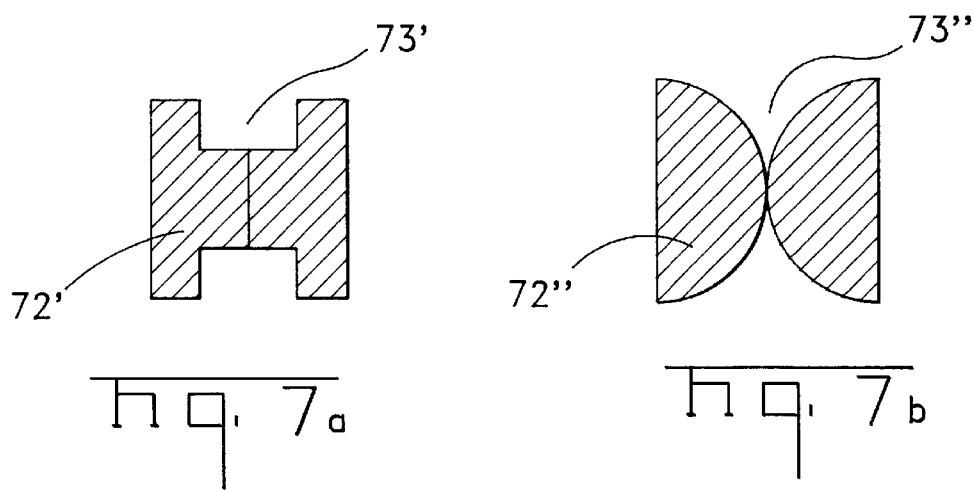
FIGS. 7a and 7b are cross-sectional views of support members in accordance with other embodiments of the present invention.

The support members of the present invention can incorporate non-circular or semi-circular shapes forming generally concave and/or convex retention areas. For example, FIG. 7a illustrates support members 72' having a plurality of retention areas 73' that are generally concave. FIG. 7b illustrates support members 72" having a plurality of retention areas 73", that are generally convex.

FIGS. 8a and 8b illustrate aspects of the present invention, more specifically, support members 82', 82" formed into generally arcuate shapes. More specifically, support members 82' are formed into semi-circular shells that can be fixed, or removably fixed, together to provide a retention area 83'. Ends 84' and 84" of support member 82' and 82" should be relatively smooth to prevent ends 84' and 84" from cutting and/or tearing the outer jacket if employed. Support members 82" are formed with a plurality of arcuate surfaces that can be fixed, or removably fixed, together to provide a plurality of retention areas 83". More particularly, retention areas 83" can include a generally concave interior portion adjacent to both support members 82" and/or a generally concave portion adjacent to a single support member 82". Another aspect of the embodiment of FIG. 8b can include at least one perforation 86" through land 85" serving as aid for separating individual modules. Of course, if perforation 86" is employed at land 85" that area would not be suitable as a retention area.

In view of the present disclosure, many modifications and other embodiments of the present invention, within the scope of the appended claims, will become apparent to a skilled artisan. For example, a plurality of dissimilar shaped support members can be incorporated or optical fiber components can be disposed in a buffer tube with or without a cushioning zone. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to low fiber count cable designs but the inventive concepts of the present invention are applicable to other cable types as well.

That which is claimed:

1. A fiber optic cable, comprising:
   at least one interface being formed by a plurality of adjacent non-stranded support members, one of said plurality of support members having a generally round cross-section;
   at least one retention area adjacent said interface, said retention area disposed generally longitudinally and non-helically relative to an axis of the cable;
   at least one optical fiber component disposed within said at least one retention area; and
   a cable jacket generally surrounding said support members.

2. The fiber optic cable according to claim 1, said at least one retention area having a generally concave shape.

3. The fiber optic cable according to claim 1, said at least one retention area having a generally convex shape.

4. The fiber optic cable according to claim 1, said at least one retention area having a generally concave and convex shape.

5. The fiber optic cable according to claim 1, one of said plurality of support members includes steel.

6. The fiber optic cable according to claim 1, one of said plurality of support members includes a material selected from the following aluminum, carbon fiber, copper, composite metal, plastic, glass-reinforced plastic or steel.

7. The fiber optic cable according to claim 1, said plurality of support members having a center and two of said plurality of support members having offset centers.

8. The fiber optic cable according to claim 1, said at least one optical fiber component being adjacent to a cushioning zone.

9. The fiber optic cable according to claim 8, said cushioning zone substantially surrounding the at least one optical fiber component.

10. The fiber optic cable according to claim 1, further comprising a water-blocking component disposed between an outer surface of said support members and said cable jacket.

11. The fiber optic cable according to claim 1, a cross-sectional area of the cable being non-circular.

12. The fiber optic cable according to claim 1, said cable jacket including an indicia.

13. The fiber optic cable according to claim 1, said at least one retention area including at least two generally distinct shaped areas.

14. The fiber optic cable according to claim 1, said cable having a non-preferential bend characteristic.

15. The fiber optic cable according to claim 1, said cable having a preferential bend characteristic.

16. The fiber optic cable according to claim 1, further comprising an interfacial layer at least partially disposed between an outer surface of said support members and said cable jacket.

17. A fiber optic cable, comprising:
    at least one interface being formed by a plurality of adjacent non-stranded support members;
    at least one retention area adjacent said interface, said retention area disposed generally longitudinally and non-helically relative to an axis of the cable;
    at least one optical fiber component disposed within said at least one retention area;
    a cushioning zone disposed in said at least one retention area and adjacent to said optical fiber component; and
    an interfacial layer and water-blocking component at least partially disposed between an outer surface of said support members and a cable jacket generally surrounding said support members.

18. The fiber optic cable according to claim 17, said at least one retention area having a generally concave shape.

19. The fiber optic cable according to claim 17, said at least one retention area having a generally convex shape.

20. The fiber optic cable according to claim 17, said at least one retention area having a generally concave and convex shape.

21. The fiber optic cable according to claim 17, one of said plurality of support members having a generally non-circular cross-section.

22. The fiber optic cable according to claim 17, one of said plurality of support members having a generally round cross-section.

23. The fiber optic cable according to claim 17, one of said plurality of support members being generally a semi-circular shell.

24. The fiber optic cable according to claim 23, said semi-circular shell further comprising at least one perforation through a land area of said semi-circular shell.

25. The fiber optic cable according to claim 17, said plurality of support members comprising a generally flat support member and at least one generally arcuate support member.

26. The fiber optic cable according to claim 17, one of said plurality of support members includes steel.

27. The fiber optic cable according to claim 17, one of said plurality of support members includes a material selected from the following aluminum, carbon fiber, copper, composite metal, plastic, glass-reinforced plastic or steel.

28. The fiber optic cable according to claim 17, said plurality of support members having a center and two of said plurality of support members having offset centers.

29. The fiber optic cable according to claim 17, said cushioning zone substantially surrounding said optical fiber component for decoupling said optical fiber component from said support members.

30. The fiber optic cable according to claim 17, a cross-sectional area of the cable being non-circular.

31. The fiber optic cable according to claim 17, the cable including an indicia.

32. The fiber optic cable according to claim 17, said at least one retention area including at least two generally distinct shaped areas.

33. The fiber optic cable according to claim 17, said cable having a non-preferential bend characteristic.

34. The fiber optic cable according to claim 17, said cable having a preferential bend characteristic.

35. A fiber optic cable, comprising:
    at least one interface being formed by a plurality of adjacent non-stranded support members;
    at least one retention area adjacent said interface, said retention area disposed generally longitudinally and non-helically relative to an axis of the cable;
    at least one optical fiber component disposed within said at least one retention area; and
    the cable having a strain of about a 1.0% or less when applying about a 1,000 lb. tensile force.

36. The fiber optic cable according to claim 35, said at least one retention area having a generally concave shape.

37. The fiber optic cable according to claim 35, said at least one retention area having a generally convex shape.

38. The fiber optic cable according to claim 35, said at least one retention area having a generally concave and convex shape.

39. The fiber optic cable according to claim 35, one of said plurality of support members having a generally non-circular cross-section.

40. The fiber optic cable according to claim 35, one of said plurality of support members having a generally round cross-section.

41. The fiber optic cable according to claim 35, one of said plurality of support members being generally a semi-circular shell.

42. The fiber optic cable according to claim 41, said semi-circular shell further comprising at least one perforation through a land area of said semi-circular shell.

43. The fiber optic cable according to claim 35, said plurality of support members comprising a generally flat support member and at least one generally arcuate support member.

44. The fiber optic cable according to claim 35, said cable having a strain of about 0.3% or less when applying about a 500 lb. tensile force.

45. The fiber optic cable according to claim 35, said cable having a strain of about 0.3% or less when applying about a 300 lb. tensile force.

46. The fiber optic cable according to claim 35, one of said plurality of support members includes steel.

47. The fiber optic cable according to claim 35, one of said plurality of support members includes a material selected from the following aluminum, carbon fiber, copper, composite metal, plastic, glass-reinforced plastic or steel.

48. The fiber optic cable according to claim 35, said at least one optical fiber component being adjacent to a cushioning zone.

49. The fiber optic cable according to claim 35, said cushioning zone substantially surrounding said at least one optical fiber component.

50. The fiber optic cable according to claim 35, further comprising a water-blocking component being disposed between an outer surface of said support members and a cable jacket.

51. The fiber optic cable according to claim 35, said cable jacket including an indicia.

52. The fiber optic cable according to claim 35, further comprising an interfacial layer at least partially disposed between an outer surface of said support members and a cable jacket.

53. The fiber optic cable according to claim 35, said cable having a non-preferential bend characteristic.

54. The fiber optic cable according to claim 35, said cable having a preferential bend characteristic.

* * * * *